United States Patent

Richardson

[15] 3,651,357
[45] Mar. 21, 1972

[54] DYNAMO-ELECTRIC MACHINES

[72] Inventor: Philip Richardson, Newcastle-upon-Tyne, England

[73] Assignee: Reyrolle Parsons Limited, Hebburn, County Durham, England

[22] Filed: Aug. 5, 1970

[21] Appl. No.: 61,371

[30] Foreign Application Priority Data

Aug. 5, 1969 Great Britain.............................39057

[52] U.S. Cl.............................................310/256, 310/262
[51] Int. Cl. ..........................................................H02k 1/12
[58] Field of Search..........................................310/256, 262

[56] References Cited

UNITED STATES PATENTS 900,839 10/1908 Elshoff...................................310/262
921,505 5/1909 Behrend................................310/262

Primary Examiner—D. X. Sliney
Attorney—Holman & Stern

[57] ABSTRACT

A rotary dynamo-electric machine comprising a field winding and an armature winding one of which windings is carried by a rotor of the machine so that the magnetic flux due to the field winding moves relative to the electrical conductors in the armature winding when the rotor rotates, both the field and armature windings being associated with cores of magnetic material through which the magnetic flux circuit of the machine passes, in which machine the cross-sectional area of the magnetic core associated with the field winding is progressively reduced, at least in the regions of the magnetic poly centers, at the axially opposed ends of the core so as to progressively increase the reluctance of the magnetic flux circuit towards the axially opposed ends of the cores.

10 Claims, 5 Drawing Figures

INVENTOR
PHILIP RICHARDSON.
BY Holman & Stern
ATTORNEYS

FIG. 4.
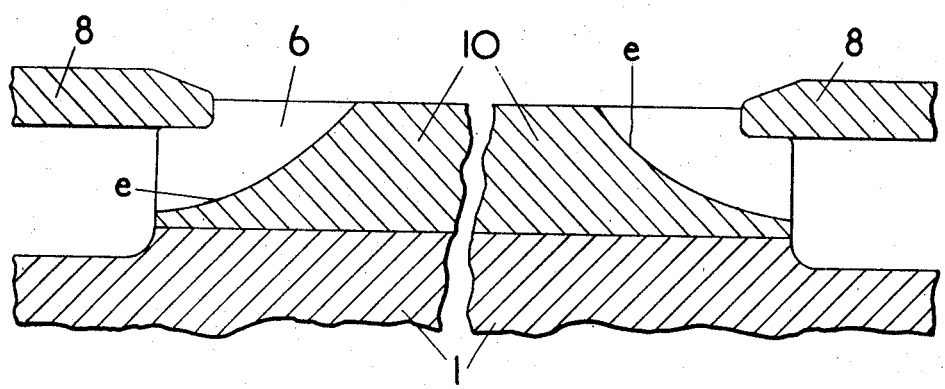
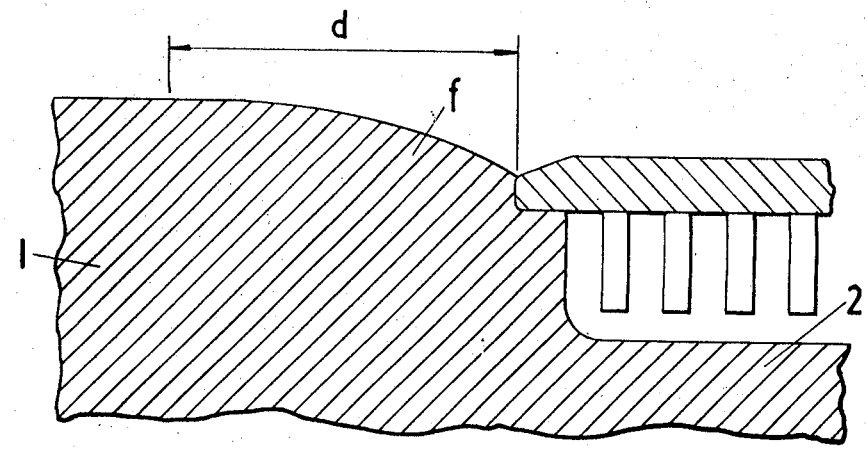
FIG. 5.

DYNAMO-ELECTRIC MACHINES

This invention relates to dynamo-electric machines and is particularly, though not exclusively, concerned with generators having rotating field windings.

Large electrical generators of the turbo-alternator type generally comprise a field winding wound on a rotating core of magnetic material and an armature winding arranged on a stator core also of magnetic material, the latter usually being in laminated form. In such machines stator core losses resulting from the magnetic flux of the magnetic circuit of the machine entering the face of the stator core laminations at the axially opposed ends of the core present a design problem. A known method of reducing such losses which has been adopted is to shape the ends of the stator core in the form of steps so that the air gap presented to the magnetic flux linking the rotor and stator cores increases towards the stator core ends. This arrangement serves to increase the general reluctance of the magnetic circuit, so reducing the intensity of flux loading in the laminations at the stator core ends.

The present invention is concerned with further means for minimizing the problem described above which may be adopted as an alternative or in addition to shaping of stator core ends.

The invention consists in a rotary dynamo-electric machine comprising a field winding and an armature winding one of which windings is carried by a rotor of the machine so that the magnetic flux due to the field winding moves relative to the electrical conductors in the armature winding when the rotor rotates, both the field and armature windings being associated with cores of magnetic material through which the magnetic flux circuit of the machine passes, in which machine the cross-sectional area of the magnetic core associated with the field winding is progressively reduced, at least in the regions of the magnetic pole centers, at the axially opposed ends of the core so as to progressively increase the reluctance of the magnetic flux circuit towards the axially opposed ends of the cores.

The invention also consists in a machine in accordance with the preceding paragraph in which the cross-sectional area of the magnetic core associated with the field winding is progressively reduced in the regions of the magnetic pole centers at the axially opposed ends of the core by providing one or more generally axially disposed slots in the peripheral surface of the core, the said slots each extending axially along a portion of the rotor core near one of its ends and progressively increasing in radial depth from zero at the axially inner end of the slot to the maximum at the axially outer end of the slot.

The invention also consists in a machine in accordance with the first of the two preceding paragraphs in which the cross-sectional area of the magnetic core associated with the field winding is progressively reduced at the axially opposed ends of the core by providing a progressive change in the diameter of the core near its ends, at least in the regions of the magnetic pole centers.

The invention also consists in a machine in accordance with any of the preceding three paragraphs in which the magnetic core associated with the field winding is the rotor core of the machine.

The invention also consists in a machine in accordance with the preceding paragraph in which the rotor magnetic core is cylindrically shaped, the field winding being wound on the core and lying in a plurality of axially extending slots of substantially uniform depth disposed circumferentially about and formed in the cylindrical surface of the core.

The invention also consists in a machine in accordance with the preceding paragraph in which the regions of the magnetic pole centers of the rotor magnetic core lie between groups of rotor winding slots, and one or more further axially extending slots are provided in the cylindrical rotor core surface in each of these regions at the ends of the core only, the said further slots progressively increasing in radial depth towards the rotor core ends.

The invention also consists in a machine in accordance with the preceding paragraph in which the regions of the magnetic pole centers of the rotor magnetic core lie between groups of rotor winding slots, and one or more further axially extending slots are provided in the cylindrical rotor core surface in each of these regions at the ends of the core only, the said further slots progressively increasing in radial depth towards the rotor core ends.

The invention also consists in a machine in accordance with the first of the preceding two paragraphs in which the regions of the magnetic pole centers of the rotor magnetic core lie between groups of rotor winding slots and one or more further axially extending slots are provided in the cylindrical rotor core surface in each of these regions extending substantially the full length of the rotor core, the said slots each having a filler of magnetic material positioned therein and the radial depth of end portions of each filler progressively decreasing towards the ends of the filler.

The invention also consists in a machine in accordance with the first of the preceding three paragraphs, in which the cross-sectional area of the rotor magnetic core is progressively reduced at its axially opposed ends by providing a progressive reduction in the diameter of the rotor core near its ends, at least in the regions of the magnetic pole centers, the diameter being progressively reduced towards the core ends.

The invention also consists in a machine in accordance with any of the preceding three paragraphs in which the progressive reduction in cross-sectional area of a magnetic core at its axially opposed ends does not extend to the end face of the core but stops short thereof to leave a supporting flange at each end of the core upon which an end winding retaining ring may be located and supported.

The invention also consists in a machine in accordance with the first of the preceding six paragraphs in which the magnetic core associated with the field winding is provided with two or more salient pole portions about which the rotor field winding is wound.

The invention also consists in a rotary dynamo-electric machine substantially as described herein with reference to the accompanying drawings, of which:

FIG. 4 shows a cross section, through parts of opposing end portions of a turbo-generator rotor core in accordance with a further embodiment of the invention; and FIG 5 shows a cross section similar to that shown in FIG. 1 of part of an end portion of a turbo-generator rotor core in accordance with yet a further embodiment of the present invention.

Figure 1:
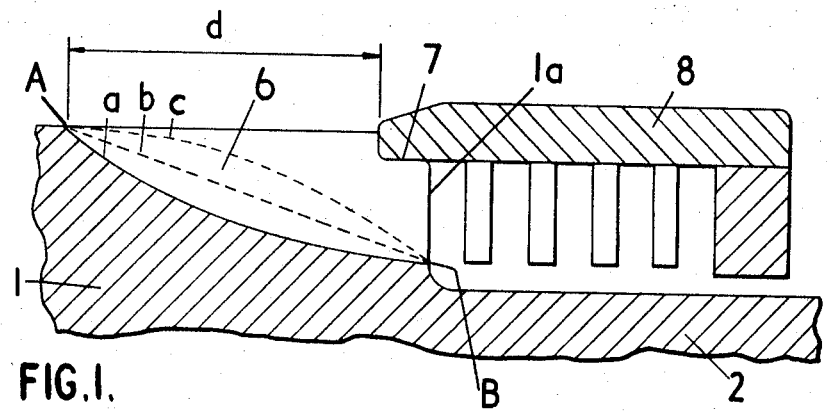
FIG. 1 shows a cross section through part of an end portion of a turbo-generator rotor core in accordance with one embodiment of the present invention.
Figure 2:
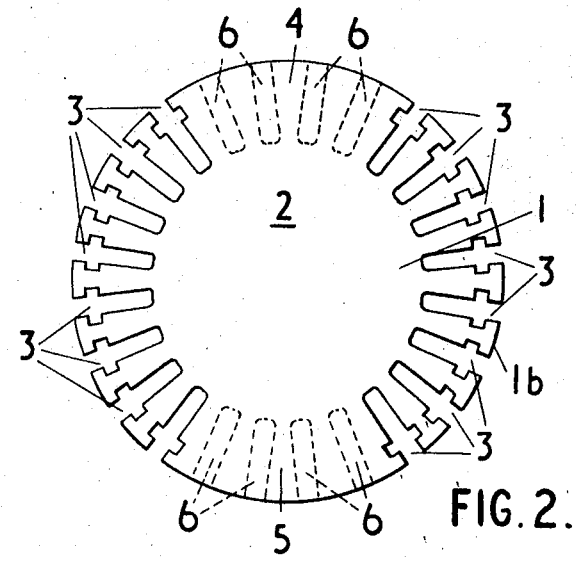
FIG. 2 shows an end view of the rotor core shown in FIG. 1.

In carrying the invention into effect in one form, by way of example, an referring first to FIGS. 1 and 2, the end portion of a turbo-generator rotor core 1 shown comprises a solid cylindrical forging with a rotor shaft portion 2 of reduced diameter extending beyond the core end-face 1a.

The core is provided with two groups of eight axially extending slots 3 circumferentially spaced about its cylindrical surface 1b, in which the rotor field winding conductors (not shown) are situated. The rotor winding is energized in such a way that a two-pole rotor is produced, one magnetic pole center being situated in the region indicated by reference numeral 4 between winding slots 3, and the other magnetic pole center being situated diametrically opposite in the region indicated by reference numeral 5.

The cross-sectional area of the rotor core at the ends of the core and in the region of the magnetic pole centers is reduced in the embodiment of the invention shown in FIGS. 1 and 2 by providing further slots 6 in the core, as show, These slots extend axially along the periphery of the core near the core ends only, and progressively increase in depth toward the core ends. The depth of the slot 6 shown in FIG. 1, for example, varies from zero at its end A furthest from the end of the core to a maximum at its end B, where it opens into end-face 1a. The slot extends substantially over an axial length d of the core, as shown.

While in FIG. 2, four slots 6 are shown in the region of each pole center, the invention is not restricted to any given number of slots. It falls within the scope of the invention to simply have a sector of material removed at the core ends in the pole center regions instead of a plurality of slots as shown in FIGS. 1 and 2. The latter arrangement, however, would remove the spigot 7 onto which the rotor end winding retaining ring 8 is normally shrunk, and the provision of alternative end winding retaining ring supports could lead to undesirably complex rotor designs.

The profile of the bottom of slot 6, indicated by reference a and its relationship with the distance d depends upon the general parameters, such as air gap length, specific rating, etc., for any given machine. Possible alternative profiles for the bottom of slot 6 are indicated by the dashed lines b and c.

In order to minimize noise from open slots 6 such as have been described, closing wedges, preferably of nonmagnetic material such as bronze or aluminum, may be inserted into the slots.

Figure 3:
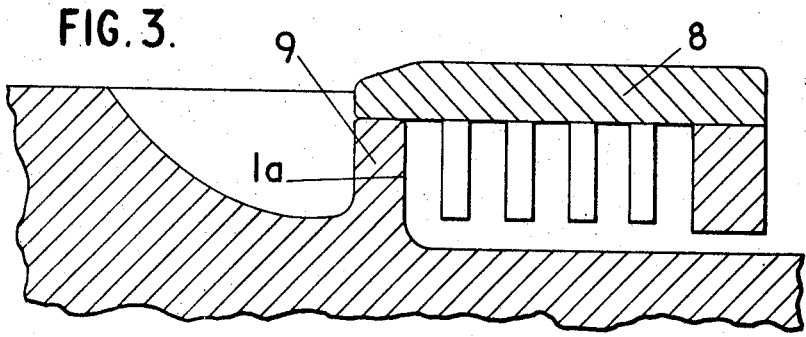
FIG. 3 shows a cross section similar to FIG. 1, through part of an end portion of a turbo-generator rotor core in accordance with an alternative embodiment of the invention.

In the alternative form of the invention shown in FIG. 3, slots 6 similar to those shown in FIG. 1 are again machined in a rotor core, but do not extend to the end-face 1a of the core. The deepest part of the slot is arranged to stop short of end-face 1a so that an end wall 9 remains at the end of the rotor in the region of the pole centers to give firmer support for the end winding retaining ring 8.

FIG. 4 shows a further embodiment of the invention in which, instead of having slots 6 at the ends of a rotor core only, as shown in FIGS. 1 and 3, some or all of the additional slots 6 made in the rotor for the purpose of the invention extend the full length of the rotor core. It is known to make such slots in a turbo-generator rotor, in order to equalize the rigidity of the rotor about mutually perpendicular axes each perpendicular to the rotor axis. These slots are normally completely filled by rectangular steel "fillers." In accordance with the present invention, however, a slot filler such as shown by reference 10, which again may be of steel, is shaped at its ends as indicated by the reference e.

The profile of the curves e is determined from similar considerations to those previously mentioned for profiles a-c and in such that the radial depth of filler 10 decreases at its ends to give the desired increase in reluctance of the magnetic circuit.

While in the embodiments of the invention described a rotor core having 16 slots for the winding has been shown the invention is not limited to this particular form of rotor and rotor cores having a greater or lesser number of slots for the rotor winding may be employed.

In the alternative embodiment of the invention shown in FIG. 5, the cross-sectional area of the rotor core 1 shown is progressively reduced towards the core end by tapering the core over a distance d from its end, as shown by the profile indicated by reference f. The choice of the profile of the taper on rotor core 1 may be varied in a similar way to the choice of profile of the slot profiles a, b, c, or e, and the invention is not limited to the particular taper f shown. Instead of having the end winding retaining ring mounted on a reduced diameter portion of the rotor, as shown in FIG. 5, a wall similar to wall 9 of FIG. 3 may be provided to support the ring.

While the embodiments of the invention described relate to turbo-generators having cylindrical rotors carrying a field winding, the invention is equally applicable to salient pole generators and to machines other than generators. The invention may also be applied to machines in which the armature winding rotates and the field winding is stationary.

I claim:

1. A rotary dynamo-electric machine comprising a field winding and an armature winding one of which windings is carried by a rotor of the machine so that the magnetic flux due to the field winding moves relative to the electrical conductors in the armature winding when the rotor rotates, both the field and armature windings being associated with cores of magnetic material through which the magnetic flux circuit of the machine passes, in which machine the cross-sectional area of the magnetic core associated with the field winding is progressively reduced, at least in the regions of the magnetic pole centers, at the axially opposed ends of the core over a substantial length of a main body portion of the core in which active axial conductor portions of the field winding are located, so as to progressively increase the reluctance of the magnetic flux circuit towards the axially opposed ends of the cores.

2. A machine as claimed in claim 1, in which the cross-sectional area of the magnetic core associated with the field winding is progressively reduced in the regions of the magnetic pole centers at the axially opposed ends of the core by providing one or more generally axially disposed slots in the peripheral surface of the core, the said slots each extending axially along a portion of the rotor core near its ends and progressively increasing in radial depth from zero at an axially inner end of the slot to a maximum at an axially outer end of the slot.

3. A machine as claimed in claim 1, in which the cross-sectional area of a magnetic core associated with the field winding is progressively reduced at the axially opposed ends of the core by providing a progressive change in a diameter of the core near its ends, at least in the regions of the magnetic pole centers.

4. A machine as claimed in claim 1, in which the magnetic core associated with the field winding is the rotor core of the machine.

5. A machine as claimed in claim 4, in which the rotor magnetic core is cylindrically shaped, the field winding being wound on the rotor core and lying in a plurality of axially extending slots of substantially uniform depth disposed circumferentially about and formed in the cylindrical surface of the core.

6. A machine as claimed in claim 5, in which regions of the magnetic pole centers of the rotor magnetic core lie between groups of rotor windings slots, and one or more further axially extending slots are provided in the cylindrical rotor core surface in each of said regions but only at the ends of the rotor core, the said further slots progressively increasing in radial depth substantially towards the rotor core ends.

7. A machine as claimed in claim 5, in which regions of the magnetic pole centers of the rotor magnetic core lie between groups of rotor winding slots and one or more further axially extending slots are provided in the cylindrical rotor core surface in each of these regions extending substantially the full length of the rotor core, the said further slots each having a filler member of magnetic material positioned therein and the radial depth of end portions of each said filler member progressively decreasing towards the ends of the filler.

8. A machine as claimed in claim 5, in which the cross-sectional area of the rotor magnetic core is progressively reduced at its axially opposed ends by providing a progressive reduction in diameter of the rotor core near its ends, at least in the regions of the magnetic pole centers, the diameter being progressively reduced towards the core ends.

9. A machine as claimed in claim 6, in which the progressive reduction in cross-sectional area of the magnetic core at its axially opposed ends does not extend to the end face of the core but stops short thereof to leave a supporting flange at each end of the core upon which flange an end winding retaining ring may be located and supported.

10. A machine as claimed in claim 4, in which the magnetic core associated with the field winding is provided with two or more salient pole portions about which the rotor field winding is wound.

* * * * *